(12) United States Patent
Serout et al.

(10) Patent No.: US 12,495,965 B2
(45) Date of Patent: Dec. 16, 2025

(54) METHOD AND DEVICE FOR CHECKING VITAL PARAMETERS

(71) Applicant: Robert Bosch GmbH, Stuttgart (DE)

(72) Inventors: Anne Serout, Aidlingen (DE); Johannes Meyer, Haseluenne (DE)

(73) Assignee: ROBERT BOSCH GMBH, Stuttgart (DE)

( * ) Notice: Subject to any disclaimer, the term of this patent is extended or adjusted under 35 U.S.C. 154(b) by 956 days.

(21) Appl. No.: 17/648,756

(22) Filed: Jan. 24, 2022

(65) Prior Publication Data

US 2022/0233073 A1 Jul. 28, 2022

(30) Foreign Application Priority Data

Jan. 28, 2021 (DE) .................. 10 2021 200 773.2

(51) Int. Cl.
| | |
|---|---|
| *A61B 3/16* | (2006.01) |
| *A61B 3/113* | (2006.01) |
| *A61B 3/12* | (2006.01) |
| *A61B 5/00* | (2006.01) |

(52) U.S. Cl.
CPC .............. *A61B 3/16* (2013.01); *A61B 3/113* (2013.01); *A61B 3/1233* (2013.01); *A61B 3/1241* (2013.01); *A61B 5/6803* (2013.01)

(58) Field of Classification Search
CPC ......... A61B 3/16; A61B 3/113; A61B 3/1233; A61B 3/1241; A61B 5/6803; A61B 5/021; A61B 5/0066; A61B 3/1173; A61B 3/1225; A61B 3/165; A61B 3/1005; A61B 3/1216; G01B 7/14; G01B 9/02092

USPC ........................................................ 351/221
See application file for complete search history.

(56) References Cited

U.S. PATENT DOCUMENTS

| | | | |
|---|---|---|---|
| 2012/0293773 A1* | 11/2012 | Publicover ........... | A61B 3/0008 351/210 |
| 2013/0114850 A1* | 5/2013 | Publicover ........... | A61B 3/0025 382/103 |
| 2013/0184554 A1* | 7/2013 | Elsheikh ............... | A61B 3/16 600/398 |
| 2013/0278631 A1* | 10/2013 | Border ................ | G06F 3/04842 345/633 |
| 2016/0379462 A1* | 12/2016 | Zack ..................... | G08B 21/043 340/539.12 |
| 2017/0000326 A1* | 1/2017 | Samec .................... | A61B 3/165 |
| 2017/0059299 A1* | 3/2017 | Safrani .................. | G02B 21/26 |
| 2018/0008141 A1* | 1/2018 | Krueger ............... | A61B 5/7257 |

(Continued)

*Primary Examiner* — Mohammed A Hasan
(74) *Attorney, Agent, or Firm* — NORTON ROSE FULBRIGHT US LLP

(57) ABSTRACT

A method for checking vital parameters. A quantitative determination of distance and/or thickness of components of the eye is performed on the basis of data of a laser feedback interferometry measurement of a human eye. A change of at least one vital parameter is ascertained in the ascertainment of a change over time of a determined distance and/or of a determined thickness of a component of the eye. The components of the eye comprising at least a cornea and/or an iris and/or a pupil and/or a lens and/or a vitreous body and/or a retina. The vital parameter comprising an eye pressure and/or a high blood pressure and/or an arteriosclerosis and/or a metabolism and/or an abnormality of the retina in terms of color or topography and/or a blood clot. A device for checking vital parameters is also described.

15 Claims, 3 Drawing Sheets

(56) References Cited

U.S. PATENT DOCUMENTS

2019/0076015 A1\* 3/2019 Johansson .............. G06V 40/19
2022/0197022 A1\* 6/2022 Deterre .................... A61F 9/08

\* cited by examiner

METHOD AND DEVICE FOR CHECKING VITAL PARAMETERS

CROSS REFERENCE

The present application claims the benefit under 35 U.S.C. § 119 of German Patent Application No. DE 10 2021 200 773.2 filed on Jan. 28, 2021, which is expressly incorporated herein by reference in its entirety.

FIELD

The present invention relates to a method and to a device for checking vital parameters.

BACKGROUND INFORMATION

In tonometry, the measurement of the intraocular pressure (IOP), there exist various methods. They relate to mechanical measurements of the restoring force of the eye, which is anaesthetized using pupil dilating substances and hence require trained medical personnel and are uncomfortable for the patient and time-consuming. The measured values of the interior pressure of the eye is influenced by the thickness and stiffness of the cornea. To measure the thickness of the cornea (approx. 550 µm), there exist optical methods (OCP, waveform) and methods based on ultrasound, which required direct contact with the cornea. These conventional methods require trained medical personnel and are uncomfortable for the patient and time-consuming.

SUMMARY

It is an object of the present invention to provide an improved method and an improved device for checking vital parameters.

This object may be attained by the method and the device in accordance with example embodiments of the present invention. Advantageous developments of the present invention are disclosed herein.

According to one aspect of the present invention, a method for checking vital parameters is provided, a quantitative determination of distance and/or thickness of components of the eye being performed on the basis of data of a laser feedback interferometry measurement of a human eye, a change of at least one vital parameter being ascertained in the ascertainment of a change over time of a determined distance and/or a determined thickness of a component of the eye, the components of the eye comprising at least a cornea and/or an iris and/or a pupil and/or a lens and/or a vitreous body and/or a retina, and the vital parameter comprising an eye pressure and/or a high blood pressure and/or an arteriosclerosis and/or a metabolism and/or a blood clot and/or an abnormality of the retina in terms of color or topography.

This makes it possible to achieve a technical advantage of being able to provide an improved method for checking vital parameters based on optical examinations of the human eye. For this purpose, changes of individual components of the eye such as for example the cornea, the iris, the pupil, the lens, the vitreous body or the retina are examined by optical measurements, in order to be able, in the event that changes of the components are detected, to draw inferences regarding vital parameters such as for example the eye pressure, high blood pressure, arteriosclerosis, metabolic irregularities, abnormalities in terms of color or topography or possibly blood clots within the eye. For the optical examination of the individual components of the eye, laser feedback interferometry measurements are performed, on the basis of which it is possible to ascertain distances or thicknesses of the individual components of the eye. In the case of deviations or changes over time of the distances or thicknesses of the respectively detected components of the eye, it is thus possible to infer changes of the mentioned vital parameters. The use of laser feedback interferometry for observing the eye allows for small and light measuring devices, which may be affixed for example on the head of a user. This makes it possible to span the vital parameters over a longer continuous period of time, so that it is possible to observe even changes of the component of the eye and thus of the mentioned vital parameters that progress slowly over time. Furthermore, the check of the vital parameters on the basis of laser feedback interferometry may be performed outside of an examination environment managed by medical personnel, which allows for simplified handling and makes it possible to achieve a long-term monitoring of the vital parameters and an early detection of diseases.

The measurement of the intraocular pressure (IOD) allows for the quantification of vital parameters and provides insight into the state of health of the eye as such, in that it affects the distances between and the width of integral components of the eye such as cornea, lens and retina. The intraocular pressure is an important aspect in the assessment of patients at risk e.g. of developing glaucoma, which can result in blindness. The IOD is also able to provide insight about possibly existing eye diseases or even hormonal disorders such as thyroid eye disease (TED). Pressure differences between the two eyes are also often clinically significant and possibly connected to eye diseases or to mechanical disorders of the eye such as iritis or retinal detachment. A rise of intraocular pressure may be related to anatomical problems, ophthalmitis, genetic factors or external influences such as side effects of medications. This could result in an intraocular micro-barotrauma and produce ischemic effects and mechanical stress for the nervous layer of the retina. A sudden drop of the intraocular pressure could result in an intraocular decompression, which produces micro-blisters, which could e.g. potentially cause damage to the microstructure of the retina. Furthermore, the (daily) variation of the intraocular pressure of a person relates to changes in nutrition, fitness level and the exposure to resonances, e.g. in connection with musical instruments or machines. Thus, the IOD may be regarded as an indicator of general (eye) health and well-being.

The eye may provide further information about the general state of health, which is not necessarily connected to changes of the intraocular pressure. An early indication of diabetes is a swelling of the lens cause by blood clots and changes in the retina or a change in the number and size of the blood vessels in the eye. This is also true of high blood pressure, arteriosclerosis and irregularities of the lipometabolism, which result in protein deposits on the cornea and may be a sign of an increased risk, e.g., of heart attacks.

According to one specific embodiment of the present invention, for determining distance and/or thickness, laser feedback interferometry signals of a laser feedback interferometry unit designed for emitting laser light and for receiving reflected laser light are received, a beat frequency based on an interference between laser light emitted into the eye to be examined and laser light reflected by a boundary surface of a component of the eye is determined on the basis of the signals of the laser feedback interferometry unit, and a distance between the boundary surface and the laser feedback interferometry unit being determined on the basis of the beat frequency.

This makes it possible to achieve the technical advantage of allowing for a precise distance and thickness determination of the individual components of the eye and in particular a precise detection of changes of the distances or thicknesses of the components of the eye. In this connection, the laser feedback interferometry allows for a measurement set-up that is as small as possible and technically simple. For laser feedback interferometry, possibly merely a set-up having a laser feedback interferometry unit is required, which is designed to emit laser light and to receive reflected laser light and which may be formed by a laser diode. Laser feedback interferometry allows for a precise determination of distances of the boundary surfaces of the individual components of the eye reflecting the laser light of the laser feedback interferometry unit, on the basis of which precise determinations of relative distances of the components of the eye from one another or thicknesses of individual eye components are made possible. By observing the distances or thicknesses of the individual components of the eye over a predetermined period of time, it is thus possible to obtain information about a precise change of the distances or thicknesses of the individual components.

The physical effect on which the present invention is based is the so-called "laser self-mixing" and the laser feedback interferometry based on it. In laser self-mixing, laser light or laser radiation is reflected back into the laser source and is here brought into interference with the laser light produced by the laser source. Depending on the wavelength of the emitted and reflected radiation and the path difference, the radiation produced by the laser source and the reflected radiation interfere constructively or destructively. In the case of different wavelengths of the laser source and the reflected radiation, the interference results in the production of beat frequencies, which may be detected by the laser feedback interferometry unit and on the basis of which interferometry is possible. Wavelength changes of the laser radiation of the laser source and of the reflected laser radiation may be produced for example by frequency modulations of the laser radiation by the laser source or by oscillatory motions of the laser source and associated alternating Doppler shifts of the laser radiation emitted by the laser source.

According to one specific embodiment of the present invention, a plurality of distances of a plurality of boundary surfaces of a component or of a plurality of components from the laser feedback interferometry unit are determined on the basis of a plurality of beat frequencies, relative distances between multiple components or a thickness of a component being determined on the basis of the plurality of distances.

This makes it possible to achieve the technical advantage of allowing for a precise distance or thickness determination of the individual eye components.

According to one specific embodiment of the present invention, an intensity of the laser light reflected by a boundary surface of a component of the eye is determined for a specific beat frequency, a reflectivity of the boundary surface being determined on the basis of the intensity of the reflected laser light, and in an ascertainment of a change of the intensity, an opacity and/or a change of a surface quality of the component being ascertained.

This makes it possible to achieve the technical advantage of being able to observe additionally changes in the reflectivity of the individual boundary surfaces of the components of the eye. This makes it possible to ascertain for example an opacity or a change of the surface quality of the individual components of the eye, for example of the lens or the cornea or even of the vitreous body. This allows for further access to additional vital parameters.

According to one specific embodiment of the present invention, an eye movement and/or an eye acceleration and/or an orientation of the eye relative to the laser feedback interferometry unit is determined by taking into account a Doppler shift of a beat frequency.

This makes it possible to achieve the technical advantage of allowing for a precise determination of eye movements.

According to one specific embodiment of the present invention, a two-dimensional or three-dimensional structure of at least one component of the eye is determined for different orientations of the eye relative to the laser feedback interferometry unit on the basis of signals of the laser feedback interferometry unit.

This makes it possible to achieve the technical advantage of allowing for a detailed examination of the individual eye components. Because of the constant eye movement, the laser beams of the laser feedback interferometry unit strike different areas of the individual components of the eye, which makes it possible to scan and thus examine continuous surfaces of the components of the eye. This makes it possible to achieve a comprehensive examination of the individual components of the eye.

According to a second aspect of the present invention, a device for checking vital parameters is provided, the device comprising at least one laser feedback interferometry unit, the laser feedback interferometry unit being designed to emit laser light into an eye of a user of the device, to receive laser light reflected by a component of the eye and to generate signals for a laser feedback interferometry.

This makes it possible to achieve the technical advantage of being able to provide an improved device for checking vital parameters. The device for checking vital parameters is here developed as a laser feedback interferometry unit, which is designed to perform a laser feedback interferometry. For this purpose, the device for checking the vital parameter requires merely a laser feedback interferometry unit, which may be designed to be technically simple, light and of a small size, which makes it possible to provide a device for checking vital parameters that is simple to handle.

According to one specific embodiment of the present invention, the device is designed to carry out a method for checking vital parameters in accordance with one of the preceding specific embodiments.

This makes it possible to achieve the technical advantage of being able to provide an improved device for checking vital parameters, which is designed to carry out the method of the present invention for checking vital parameters based on the described laser feedback interferometry examination of components of the human eye having the aforementioned advantages.

According to one specific embodiment of the present invention, the laser feedback interferometry unit is designed to emit frequency-modulated laser light.

This makes it possible to achieve the technical advantage of allowing for a precise laser feedback interferometry to be carried out. The emission of frequency-modulated laser light through the laser feedback interferometry unit makes it possible to achieve the formation of beat frequencies when there is an interference of the emitted laser light and the laser light reflected by a boundary surface of a component of the eye, on the basis of which a reliable determination of the distances of the boundary surfaces from the laser feedback interferometry unit is possible.

According to one specific embodiment of the present invention, the laser feedback interferometry unit is designed to perform an oscillatory movement.

This makes it possible to achieve the technical advantage that through the Doppler shift between emitted and reflected laser light of the oscillating laser feedback interferometry unit, precise beat frequencies may be achieved in the interference of the emitted and reflected laser light.

According to one specific embodiment of the present invention, the device is developed as a pair of glasses, the at least one laser feedback interferometry unit being situated in a frame of the pair of glasses.

This makes it possible to achieve the technical advantage that using the device for checking vital parameters it is possible to perform a long-term examination comfortably and without difficulty. For this purpose, the device is able to be affixed on a head of a user and takes the form of a pair of glasses, for example. The user may thus wear the pair of glasses over a continuous period of time, while the vital parameters are checked throughout in the form of repeated laser feedback interferometry measurements of individual components of the eyes of the user. This makes it possible to achieve a long-term check of the vital parameters, without requiring elaborate, cost-intensive examinations by medical personnel that are arduous for the user. The respective user is thus able to use the device without difficulty in daily life, without adverse influences on the quality of life of the user, so that a long-term examination of the vital parameters is hereby made possible in particular during the daily life of the user.

According to one specific embodiment of the present invention, the device further comprises a holographic optical element, the holographic optical element being situated in a glass of the pair of glasses and being designed to conduct laser light of the laser feedback interferometry unit into an eye of the user wearing the pair of glasses.

This makes it possible to achieve the technical advantage of allowing for an increased resolution of the distance or thickness determinations of the individual eye components. The holographic optical elements situated in the glass of the device in the form of a pair of glasses makes it possible to increase a length of travel between the laser feedback interferometry unit emitting the laser light and the boundary surface of the component of the eye to be examined that respectively reflects the laser light. This makes it possible to achieve a greater mutual spacing between the beat frequencies corresponding to the individual boundary surfaces of the different components of the eye in the frequency spectrum recorded by the laser feedback interferometry unit, which allows for a more precise separation of the individual beat frequencies and therefore a more precise determination of the distances of the respective boundary surfaces from the laser feedback interferometry unit and therefore of the respective relative distances or thicknesses of the individual components of the eye.

According to one specific embodiment of the present invention, the at least one laser feedback interferometry unit comprises a laser source and a photodiode.

This makes it possible to achieve the technical advantage of being able to provide a design of a laser feedback interferometry unit that is as simple and powerful as possible.

According to one specific embodiment of the present invention, the at least one laser feedback interferometry unit comprises a vertical cavity emitting laser having an integrated photodiode (VIP).

This makes it possible to achieve the technical advantage of being able to provide a design of a laser feedback interferometry unit that is as simple, small, highly integrated and powerful as possible.

According to one specific embodiment of the present invention, the device comprises a plurality of laser feedback interferometry units, which are situated in a rim of the glass of a pair of glasses and/or in the temple arms of the frame of a pair of glasses.

This makes it possible to achieve the technical advantage of allowing for a laser feedback interferometry measurement of the eyes of the user that is as precise as possible and thus for a check of the vital parameters of the user that is as precise as possible.

According to a third aspect of the present invention, a computer program product is provided comprising commands, which prompt a processing unit, when executing the program, to carry out the methods of the present invention for checking vital parameters according to one of the aforementioned specific embodiments.

Exemplary embodiments of the present invention are explained with reference to the figures.

DETAILED DESCRIPTION OF EXAMPLE EMBODIMENTS

Figure 1:
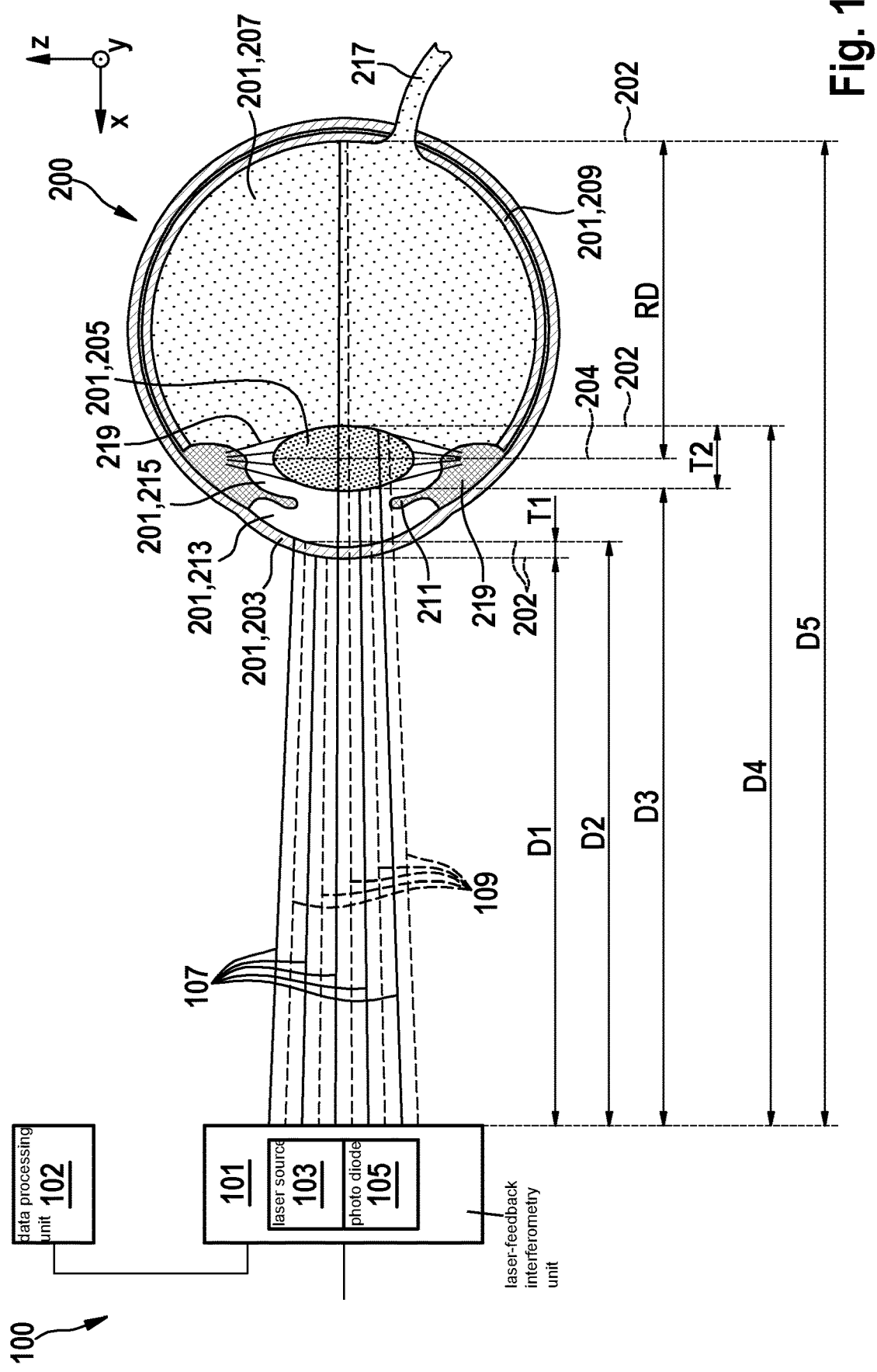
FIG. 1 shows a schematic illustration of a device for checking vital parameters and of an anatomical model of a human eye according to one specific embodiment of the present invention.

FIG. 1 shows a schematic illustration of a device 100 for checking vital parameters and of an anatomical model of a human eye 200 according to one specific embodiment of the present invention.

FIG. 1 shows a schematic anatomical model of a human eye 200. The illustrated model is merely schematic and reduced to a small number of features. Various components 201 of the eye 200 are explicitly identified in FIG. 1, in particular the cornea 203, the lens 205, the vitreous body 207, the retina 209, the iris 211, the anterior ocular chamber 213, the posterior ocular chamber 215, the optic nerve 217 and the ciliary muscle 219. The illustration shown is incomplete and not all components 201 of the eye 200 are explicitly indicated.

FIG. 1 further shows a device 100 for checking vital parameters. In the illustrated specific embodiment, device 100 comprises a laser feedback interferometry unit 101. The illustrated laser feedback interferometry unit 101 comprises a laser source 103 and a photodiode 105. Laser source 103 and photodiode 105 may be developed for example in the form of a vertical cavity emitting laser (VCEL) having an integrated photodiode (VIP).

In the illustrated specific embodiment, device 100 furthermore comprises a data processing unit 102, which is connected by a data link to the laser feedback interferometry unit 101. Data processing unit 102 may be configured to carry out the method according to the present invention for checking vital parameters. The data link may take the form of a wired or wireless connection.

In the illustrated specific embodiment, laser feedback interferometry unit 101 is designed to emit laser light 107 in the direction of the eye 200 and to receive laser light 109 reflected by components 201 of the eye 200.

In the illustrated specific embodiment, laser feedback interferometry unit 101 is situated at a distance D1 from the cornea 203 of eye 200. FIG. 1 is illustrated merely schematically and the proportions of size and distance between device 100 and eye 200 are not shown true to scale for better representation.

To carry out the method according to the present invention for checking vital parameters, device 100 emits laser light 107 from laser source 103 of laser feedback interferometry unit 101 in the direction of eye 200. The emitted laser light 107 is reflected on various boundary surfaces 202 of the various components 201 of the eye 200 and is sent back to laser feedback interferometry unit 101.

In the illustrated specific embodiment, the emitted laser light 107 is first reflected on a front boundary surface 202 of cornea 203 in the direction of device 100. The front boundary surface 202 of cornea 203 is in this case the boundary surface situated closest to laser feedback interferometry unit 101 and is at a distance D1 from laser feedback interferometry unit 101. Portions of the emitted laser light 107, however, penetrate the transparent cornea 203 and are reflected by the rear boundary surface 202 of cornea 203 back to laser feedback interferometry unit 101. Rear boundary surface 202 is at a distance D2 from laser feedback interferometry unit 101. In turn, further portions of the emitted laser light 107 penetrate cornea 203 completely and are reflected on a front boundary surface 202 of the lens 205 back to laser feedback interferometry unit 101. The front boundary surface 202 of lens 205 is at a distance D3 from laser feedback interferometry unit 101. Portions of the emitted laser light 107, however, penetrate the transparent lens 205 and are reflected back to laser feedback interferometry unit 101 by a rear boundary surface 202, which is at a distance D4 from laser feedback interferometry unit 101. In turn, further portions of the emitted laser light 107 penetrate transparent lens 205 completely and the likewise transparent vitreous body 207 and are reflected by the boundary surface 202 of retina 209 back to laser feedback interferometry unit 101, which is at a distance D5 from boundary surface 202 of retina 209.

The laser light 109 reflected back by the individual boundary surfaces 202 of components 201 of eye 200 is received by or enters laser feedback interferometry unit 101. Within laser feedback interferometry unit 101, for example within the laser chamber of laser source 103, the laser light 109 reflected back by the individual boundary surfaces 202 interferes with the laser light 107 generated by laser source 103.

Laser source 103 may be designed in this case to emit frequency-modulated laser light 107. As a function of the length of travel, there is a path difference between the reflected laser light 109 and the laser light 107 generated by laser source 103. In the event of an interference of the emitted laser light 107 and the reflected laser light 109, a beat frequency arises as a function of the respective path difference. Due to the different lengths of travel of the laser light 109 reflected by the various boundary surfaces 202 of the various components 201 of eye 200, the interferences between the emitted laser light 107 and the laser light 109 reflected by the various boundary surfaces 202 of the various components 201 result in different beat frequencies. A laser light 109 reflected for example by lens 205 and a laser light reflected by retina 209 thus generate beat frequencies that are distinguishable from each other. On the basis of a frequency spectrum of the reflected laser light 109 recorded by device 100, it is thus possible to identify individual components 201 of eye 200 based on the respective beat frequencies of the spectrum.

The frequency modulation of the emitted laser light 107 may be achieved for example by a triangular current feed to laser source 103. The frequency-modulated radiation thus has a rising modulation edge and a falling modulation edge, for which the respective frequencies of the frequency-modulated laser radiation differ.

According to the equation provided below, the respective beat frequencies stand in a direct relationship to a distance D of the respective boundary surface 202 from the laser feedback interferometry unit 101. By analyzing the individual beat frequencies of the frequency spectrum, it is thus possible to ascertain distances D of the respective boundary surfaces 202 of the individual components 201, on which the respective laser light 109 was reflected. Based on the distances of the individual boundary surfaces from the laser feedback interferometry unit 101, it is thus possible to ascertain relative distances of the individual boundary surfaces 202 or of the respective components 201 with respect to one another. Furthermore, it is possible to ascertain thicknesses of the individual components 201 as distances between the front and rear boundary surfaces 202. In the illustration shown, the cornea 203 has thickness T1, while lens 205 has thickness T2. Lens 205 furthermore is at a relative distance RD from retina 209.

The laser beam emitted by laser feedback interferometry unit 101 has a predetermined diameter. By irradiating laser light 107 into eye 200, it is thus not possible to illuminate the entire eye 200, since access to the interior of the eye is limited in particular by the opening of the pupil. By way of an eye movement, however, for example by a rotational motion of eye 200 about the z or y axis, it is possible for laser light 107 entering through the pupil to illuminate a contiguous area, in particular of lens 205 and of retina 209. Moreover, the eye movement makes it possible to illuminate a contiguous area of cornea 203. This allows for a two-dimensional or three-dimensional description of the individual components 201 of eye 200, in that the beat frequencies ascertained for the various eye positions and thus the distances of the respective boundary surfaces 202 of the respective components 201 are combined to form a contiguous two-dimensional or three-dimensional description of eye 200.

The respective eye movement or the orientation of eye 200 relative to device 100 may be ascertained in this case via corresponding Doppler shifts of the beat frequencies, ascertained by device 100, of the radiation 109 reflected by the individual components 201 and interfering with the emitted laser light 107.

As an alternative to the illustrated specific embodiment, device 100 may have a plurality of differently situated laser feedback interferometry units 101, by which a comprehensive illumination of eye 200 is made possible.

Figure 2:
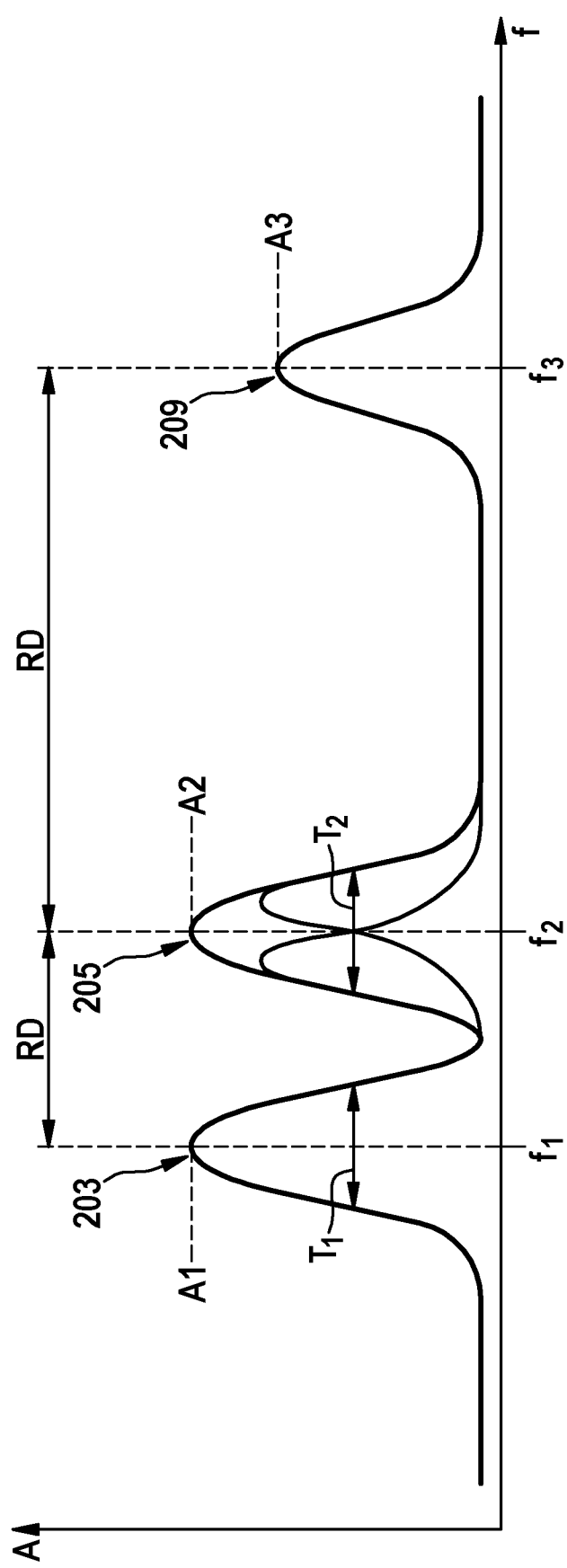
FIG. 2 shows an illustration of a spectrum of reflected laser light recorded in a method for checking vital parameters accordance with an example embodiment of the present invention.

FIG. 2 shows an illustration of a spectrum of reflected laser light 209 recorded in a method for checking vital parameters.

FIG. 2 depicts a frequency spectrum for a set-up in accordance with FIG. 1. The y axis shows the intensity of the reflected laser light 209 and the x axis shows the frequency of the reflected radiation.

By taking into account the following equation:

$$f = \frac{2D}{\lambda} \frac{d\lambda}{dI} \frac{dI}{dt},$$

where f is the beat frequency, $\lambda$ is the wavelength of the radiation and I is the operating current of laser source 103 of laser feedback interferometry unit 101, it is possible to ascertain a direct relationship between a beat frequency f of a radiation reflected on a boundary surface 202 of a component 201 of the eye 200 and a distance D of the respective boundary surface 202 from the laser feedback interferometry unit 101.

The following equation $f=(f_{up}+f_{down})/2$ takes into account the rising $f_{up}$ and falling $f_{down}$ modulation edges of the frequency-modulated laser light, which in the frequency spectrum results in two different peaks of two different beat frequencies $f_{up}$, $f_{down}$, which respectively belong to laser light that was reflected by the same boundary surface 202. Via the above equation, it is thus possible to correct the effects of the different modulation edges and to produce respectively a peak of an individual beat frequency for laser light that is reflected by a boundary surface 202.

In the illustrated set-up, the spectrum has three peaks. The three peaks respectively correspond to reflected light of different beat frequencies. The first peak at beat frequency f1 corresponds to the laser light reflected on cornea 203. The second peak with beat frequency f2 corresponds to the laser light reflected on lens 205. The third peak with beat frequency f3 corresponds to the laser light reflected on retina 209.

It is possible to ascertain the distance between cornea 203 and lens 205 on the basis of the distance between the first two peaks in the spectrum. It is possible to ascertain the distance between lens 205 and retina 207 on the basis of the distance between the second and the third peak. When the eye moves, the laser beam performs trajectories across the cornea, and for each full triangular modulation signal, the corresponding distance spectrum is measured.

In the event of changes, for example of the eye pressure, it is possible to ascertain distance variations between the individual components 201 of eye 200 through shifts of the respective peaks within the spectrum.

On the basis of the width of the peaks, it is possible to ascertain thicknesses T1, T2, for example of cornea 203 and of lens 205, or of other components 201. On the basis of changes of the thickness of individual components, it is likewise possible to draw inferences about vital parameters such as for example blood clots in the respective components 201 or high blood pressure.

As shown in the case of the second peak, some peaks are composed of a superimposition of two peaks, which respectively result from laser light reflected by two boundary surfaces of the respective component.

Furthermore, it is possible to ascertain the reflecting power and the scattering behavior of the different boundary surfaces. A change in the reflecting power reduces [sic] the intensity of the laser light reflected on the respective boundary surface. This reduces the height of the respective peaks within the spectrum. By observing changes of the reflecting power, it is possible to ascertain opacities or other changes of the boundary surfaces of the individual components 201 of the eye 200, which may be caused for example by torn blood vessels or adiposis and may likewise indicate medical problems of the eye.

Figure 3:
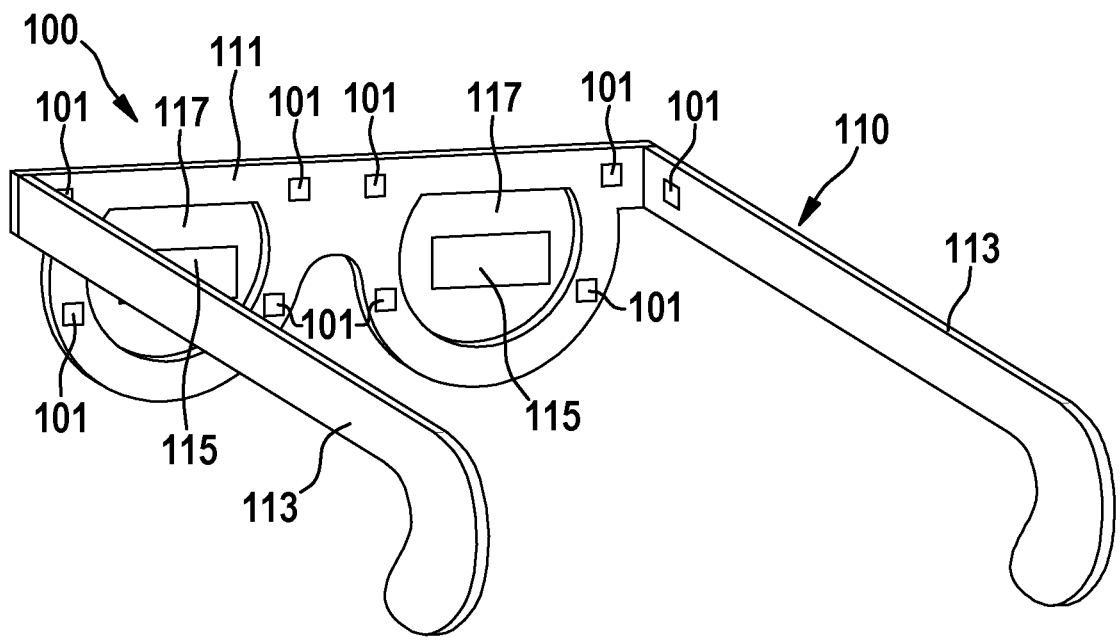
FIG. 3 shows a further schematic illustration of a device for checking vital parameters according to one specific embodiment of the present invention.

FIG. 3 shows a further schematic illustration of a device 100 for checking vital parameters according to one specific embodiment.

FIG. 3 shows a specific embodiment of device 100 for checking vital parameters. In the illustrated specific embodiment, device 100 is developed as a pair of glasses. The pair of glasses comprises a frame 110 having a rim 111 and temple arms 113. In the illustrated specific embodiment, a plurality of laser feedback interferometry units 101 is developed in the rim 111 and in the temple arms 113. As shown in FIG. 1, laser feedback interferometry units 101 may respectively include a laser source 103 and a photodiode 105 and may be developed for example as a vertical cavity emitting laser having an integrated photo diode (VIP). Laser feedback interferometry units 101 are here situated so that it is possible to irradiate a corresponding laser beam 107 into an eye 200 of a user wearing the pair of glasses.

In the illustrated specific embodiment, device 100 further comprises one holographic optical element 115 in each glass 117. Via the holographic optical elements 115, it is possible to conduct a laser light 107 emitted by the individual laser feedback interferometry units 101 into the respective eye 200 of the user wearing the pair of glasses and to transmit laser light 109 reflected by the individual components 201 of the eye 200 back into the respective laser feedback interferometry units 101. Via the holographic optical elements 115, the length of travel of the respective laser light between the respective laser feedback interferometry units 101 and the components 201 of the eye 200 may be extended. This makes it possible to increase a resolution of device 100 in accordance with equation 1) in that it is possible to separate the peaks in the frequency spectrum recorded by device 100 corresponding to the individual components 201 of eye 200 or the respective boundary surfaces 202 of the components 201, which allows for a more precise interpretation of the individual peaks and thus a more precise determination of the distances or thicknesses of the individual components 201.

The device 100 in the form of a pair of glasses may be worn by a user in daily life or at least over an extended period of time. During this period of time, device 100 is able continuously to carry out the method according to the present invention for checking vital parameters and continuously to check the individual components of the eyes 200 of the user. The data collected in the process may be processed directly by data processing unit 102, which is not illustrated in FIG. 3. Alternatively, the recorded data of the individual laser feedback interferometry units 101 may be initially stored temporarily and evaluated by an external data processing unit 102. For this purpose, device 100 may be synchronized for example with a corresponding data processing unit 102, for example a smart phone or a tablet, whereupon it is possible to perform via the smart phone or tablet a corresponding evaluation of the recorded data and an implementation of the method according to the present invention for checking vital parameters.

The wearing of device 100 in the form of a pair of glasses by the user thus makes it possible to perform over an arbitrary period of time a check of the vital parameters in the form of an examination of the individual components of the eye. In the event of changes of the components of the eye, for example an increase of the thickness of the individual components 201 or in the event of changes of the distances between components 201 of the eye 200 or for example in the event of a change of the reflectivity of the individual components of the eye, a change of the vital parameters, such as for example of the eye pressure, the blood pressure, the metabolism or possible blood clots may be inferred. It is thus possible to provide the user with an informational message so that the user, if indicated, may visit a medical doctor in order to confirm the edited [sic] changes of the vital parameters.

A data link between the device 100 in the form of a pair of glasses and the external data processing unit 102 may be developed in wired or wireless fashion.

Alternatively, device 100 may be configured to carry out the method of the present invention for checking vital parameters exclusively at predetermined points in time.

The pair of glasses may also take the form of smart glasses, for example augmented reality glasses. The smart glasses may be equipped with a suitable data processing unit, which is designed to carry out the method according to the present invention for checking vital parameters.

The number of laser feedback interferometry units 101 integrated in device 100 in the form of a pair of glasses is provided merely by way of example and may deviate from the number shown in FIG. 3.

Figure 4:
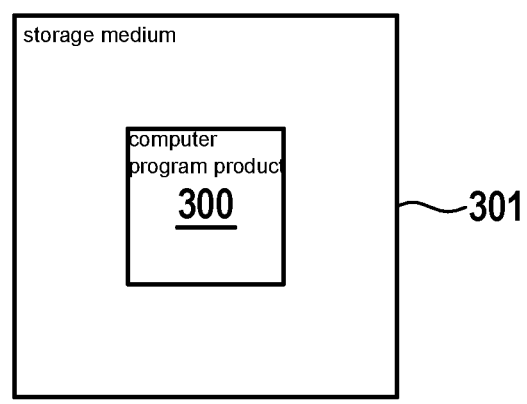
FIG. 4 shows a schematic illustration of a computer program product according to one specific embodiment of the present invention.

FIG. 4 shows a schematic illustration of a computer program product 300 according to one specific embodiment.

In the illustrated specific embodiment, computer program product 300 is stored on a storage medium 301. Storage medium 301 may be a conventional commercial storage medium.

What is claimed is:

1. A method for checking vital parameters, the method comprising the following steps:
   performing a quantitative determination of at least one of distance or thickness of components of a human eye based on data of a laser feedback interferometry measurement of the eye;
   ascertaining a change of at least one vital parameter in at least one of an ascertainment of a change over time of the determined distance or of the determined thickness of at least one of the components of the eye, the components of the eye including at least one of a cornea or an iris or a pupil or a lens or a vitreous body or a retina, and the vital parameter including at least one of an eye pressure or a high blood pressure or an arteriosclerosis or a metabolism or an abnormality of the retina in terms of color or topography or a blood clot.

2. The method as recited in claim 1, wherein for performing the distance thickness determination, laser feedback interferometry signals of a laser feedback interferometry unit configured to emit laser light and to receive reflected laser light are received, a beat frequency based on an interference between laser light emitted into the eye to be examined and laser light reflected by a boundary surface of a component of the components of the eye is determined based on signals of the laser feedback interferometry unit, and a distance between the boundary surface and the laser feedback interferometry unit being determined based on the beat frequency.

3. The method as recited in claim 2, a plurality of distances of a plurality of boundary surfaces of the component or of a plurality of the components from the laser feedback interferometry unit are determined based on a plurality of beat frequencies, relative distances between multiple components or a thickness of the component being determined based on the plurality of distances.

4. The method as recited in claim 2, wherein an intensity of the laser light reflected by the boundary surface of the component of the eye is being determined for a specific beat frequency, a reflectivity of the boundary surface being determined based on the intensity of the reflected laser light, and in an ascertainment of a change of the intensity, an opacity a change of a surface quality of the component is ascertained.

5. The method as recited in claim 2, wherein at least one of an eye movement or an eye acceleration or an orientation of the eye relative to the laser feedback interferometry unit is determined by taking into account a Doppler shift of the beat frequency.

6. The method as recited in claim 5, wherein a two-dimensional or three-dimensional structure of at least one component of the components of the eye is determined for different orientations of the eye relative to the laser feedback interferometry unit based on signals of the laser feedback interferometry unit.

7. A device for checking vital parameters, comprising:
   at least one laser feedback interferometry unit, the laser feedback interferometry unit being configured to emit laser light into an eye of a user of the device, to receive laser light reflected by a component of the eye, and to generate signals for a laser feedback interferometry,
   wherein the device is configured to analyze beat frequencies resulting from interference between the emitted laser light and the reflected laser light, the beat frequencies corresponding to optical path differences associated with boundary surfaces of components of the eye.

8. A device for checking vital parameters, comprising:
   at least one laser feedback interferometry unit, the laser feedback interferometry unit being configured to emit laser light into an eye of a user of the device, to receive laser light reflected by a component of the eye, and to generate signals for a laser feedback interferometry,
   wherein the device is configured to:
   perform a quantitative determination of at least one of distance or thickness of components of the eye based on data of a laser feedback interferometry measurement of the eye by the laser feedback interferometry unit;
   ascertain a change of at least one vital parameter in an ascertainment of a change over time of at least one of the determined distance or of the determined thickness of at least one of the components of the eye, the components of the eye including at least one of a cornea or an iris or a pupil or a lens or a vitreous body or a retina, and the vital parameter including at least one of an eye pressure or a high blood pressure or an arteriosclerosis or a metabolism or an abnormality of the retina in terms of color or topography or a blood clot.

9. The device as recited in claim 7, wherein the laser feedback interferometry unit is configured to emit frequency-modulated laser light.

10. The device as recited in claim 7, wherein the device is a device affixable on a head of a user including a pair of glasses, and the at least one laser feedback interferometry unit is situated in a frame of the pair of glasses.

11. The device as recited in claim 10, further comprising:
    a holographic optical element situated in a glass of the pair of glasses and being configured to conduct laser light of the laser feedback interferometry unit into the eye of the user wearing the pair of glasses.

12. The device as recited in claim 7, wherein the at least one laser feedback interferometry unit includes a laser source and a photodiode.

13. The device as recited in claim 12, wherein the at least one laser feedback interferometry unit includes a vertical cavity emitting laser having an integrated photodiode.

14. The device as recited in claim 10, wherein the device includes a plurality of laser feedback interferometry units, which are situated in at least one of rims or in temple arms of the frame of the pair of glasses.

15. A non-transitory computer-readable storage medium on which is stored a computer program including commands for checking vital parameters, the commands, when executed by a processing unit, causing the processing unit to perform the following steps:

performing a quantitative determination of at least one of distance or thickness of components of a human eye based on data of a laser feedback interferometry measurement of the eye;

ascertaining a change of at least one vital parameter in an ascertainment of at least one of a change over time of the determined distance or of the determined thickness of at least one of the components of the eye, the components of the eye including at least one of a cornea or an iris or a pupil or a lens or a vitreous body or a retina, and the vital parameter including at least one of an eye pressure or a high blood pressure or an arteriosclerosis or a metabolism or an abnormality of the retina in terms of color or topography or a blood clot.

\* \* \* \* \*